United States Patent
Hiraoka et al.

(10) Patent No.: US 6,735,686 B1
(45) Date of Patent: May 11, 2004

(54) DATA PROCESSING DEVICE INCLUDING TWO INSTRUCTION DECODERS FOR DECODING BRANCH INSTRUCTIONS

(75) Inventors: Tohru Hiraoka, Hadano (JP); Tomonaga Itoi, Hadano (JP); Masashi Hakamada, Hadano (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 589 days.

(21) Appl. No.: 09/608,733

(22) Filed: Jun. 30, 2000

(51) Int. Cl.[7] .............................................. G06F 9/38
(52) U.S. Cl. ..................... 712/205; 712/213; 712/237
(58) Field of Search ......................... 712/205, 206, 712/207, 233, 234, 235, 26, 237, 238, 239, 23, 210, 215, 202, 236

(56) References Cited

U.S. PATENT DOCUMENTS

| | | | |
|---|---|---|---|
| 5,442,756 A | * | 8/1995 | Grochowski et al. ....... 712/238 |
| 5,509,130 A | * | 4/1996 | Trauben et al. ............. 712/215 |
| 5,606,676 A | * | 2/1997 | Grochowski et al. ....... 712/239 |
| 5,845,101 A | * | 12/1998 | Johnson et al. ............. 712/207 |
| 5,867,682 A | * | 2/1999 | Witt et al. ................... 712/210 |
| 6,035,387 A | * | 3/2000 | Hsu et al. .................... 712/210 |
| 6,061,786 A | * | 5/2000 | Witt ............................. 712/237 |
| 6,112,018 A | * | 8/2000 | Tran et al. ................... 712/202 |
| 6,157,988 A | * | 12/2000 | Dowling ..................... 711/140 |
| 6,195,735 B1 | * | 2/2001 | Krueger et al. ............. 711/204 |
| 6,253,306 B1 | * | 6/2001 | Ben-Meir et al. ........... 712/207 |

FOREIGN PATENT DOCUMENTS

JP          63-178519          1/1990

* cited by examiner

*Primary Examiner*—Henry W. H. Tsai
(74) *Attorney, Agent, or Firm*—Townsend and Townsend and Crew LLP

(57) ABSTRACT

According to the present invention, instruction decoding can be separated into two stages. In a first instruction decoding stage, multiple instructions are decoded in a single machine cycle. Also, in the first instruction decoding stage, when a branch instruction is decoded a memory is requested to read a branch destination instruction for the branch instruction. The instructions decoded in the first instruction decoding stage is stored temporarily in instruction flow registers. In a second instruction decoding stage, instructions read sequentially from the instruction flow registers are decoded.

20 Claims, 6 Drawing Sheets read branch
destination instruction

FIG.6 (Prior Art)

```
    L   GR1,test1
    A   GR1,test2
    ST  GR1,test1
    L   GR2,test3
    A   GR2,test4
    ST  GR2,test3
    L   GR3,test1
    C   GR3,test3
    BC  pr1
    ⋮
pr1 L   GR4,test5
    A   GR4,test6
    ST  GR4,test5
    ⋮
```

L  D A T B L E
A   D A T B L E
ST   D A T B L E
L    D A T B L E
A     D A T B L E
ST     D A T B L E
L      D A T B L E
C       D A T B L E
BC       D A T B L E
⋮
L            D A T B L E
A             D A T B L E
ST             D A T B L E
⋮ read branch destination instruction

DATA PROCESSING DEVICE INCLUDING TWO INSTRUCTION DECODERS FOR DECODING BRANCH INSTRUCTIONS

CROSS-REFERENCES TO RELATED APPLICATIONS

This application claims priority from Japanese Patent Application Reference No. 11-188372, filed Jul. 2, 1999.

BACKGROUND OF THE INVENTION

The present invention relates to a pipelining data processing device. More specifically, the present invention relates to a data processing device that allows efficient execution of branch instructions.

Conventional pipeline processing techniques can provide for concurrent processing of certain computer instructions. Instructions can be processed in stages, with each stage performing certain processing of the instruction. While certain advantages are perceived with the conventional art, opportunities for greater efficiencies exist. For example, in conventional technologies, pipeline processing delays are often encountered. For instance, when a branch instruction is encountered, delays in processing can occur. Further, significant resources may be required for storing the address of the branch destination instructions, for example. Resources can include buffer memory, and the like, for example.

What is needed are more efficient techniques for processing branch instructions in pipeline processing architectures.

SUMMARY OF THE INVENTION

According to the present invention, a data processing device that can perform pipeline processing, i.e., instruction decoding and instruction execution, with minimal branch destination instruction reading delays when a branch instruction is encountered, is provided. In the instruction look-ahead system of a specific embodiment according to the present invention, instruction decoding is separated into two stages. In a first instruction decoding stage, a plurality of instructions are decoded in a single machine cycle. Also, in the first instruction decoding stage, when a branch instruction is decoded a branch destination instruction for the branch instruction is read from memory. The instructions decoded in the first instruction decoding stage are stored temporarily in instruction flow registers. In a second instruction decoding stage, instructions read sequentially from the instruction flow registers are decoded.

In a representative embodiment according to the present invention, a processor is provided. The processor can comprise a first instruction decoding stage, which can be operative to fetch instructions from an instruction cache and to store the fetched instructions into a buffer, such as an instruction buffer, for example. The first decoding stage can be further operative to read a plurality of instructions from the buffer and decode the instructions; and, if a branch instruction is decoded, fetch a branch destination instruction from the instruction cache. The processor can also comprise a second instruction decoding stage, operative to decode instructions read from said buffer substantially contemporaneously with said processing in said first instruction decoding stage.

In another representative embodiment according to the present invention, a method for pipeline processing is provided. The method can comprise a variety of elements, for example, pre-fetching instructions from an instruction cache and storing the pre-fetched instructions in an instruction buffer. The method can also comprise reading a plurality of instructions from the instruction buffer in one machine cycle, for example, and decoding the instructions in a first instruction decoder; and, if a branch instruction is decoded, requesting the instruction cache a pre-fetch of a branch destination instruction. Decoding instructions read from the instruction buffer in a second instruction decoder in order to perform instruction execution can also be part of the method. Further, a number of instructions read from the instruction buffer during one machine cycle can be greater than an average number of instructions decoded by the second instruction decoder during one machine cycle.

In a yet further representative embodiment according to the present invention, a data processing system is provided. The data processing system can comprise a memory and a processor, connected with the memory. The processor can include an instruction buffer holding instructions pre-fetched from the memory; and a first instruction register storing a plurality of instructions read from the instruction buffer. Further, a first instruction decoder decoding the plurality of instructions in the first instruction register and an instruction flow register sequentially storing instructions stored in the first instruction register can also be included in the processor. Furthermore, the processor of the system can include a second instruction register storing an instruction output from the first instruction register or from the instruction flow register. Also, a second instruction decoder decoding instructions stored in the second instruction register can be part of the processor. In representative embodiments of the system, an instruction read request is issued to the memory based on an analysis result from the first instruction decoder.

Numerous benefits are achieved by way of the present invention over conventional techniques. Embodiments according to the present invention can provide improved decoding and execution delays in instructions following branch instructions when a branch instruction is encountered. Further, specific embodiments can provide more efficient processing of instruction series. These and other benefits are described throughout the present specification.

A further understanding of the nature and advantages of the invention herein may be realized by reference to the remaining portions of the specification and the attached drawings.

BRIEF DESCRIPTION OF THE DRAWINGS

FIG. 6 illustrates a drawing showing an example of a series of instructions containing a branch instruction.

FIG. 7 illustrates a timing chart for the purpose of describing the operations for the instruction series shown in FIG. 6.

DESCRIPTION OF THE SPECIFIC EMBODIMENTS

The present invention in specific embodiments can provide a superscalar processing device that can comprise a plurality of pipelines for concurrent processing of instructions. As described with reference to the conventional technology, operand cache is typically unable to be accessed for two instructions simultaneously. Thus, two instructions are executed in parallel only when conflicts do not occur. Specific embodiments described herein can provide superscalar processing devices, but the present invention can also be implemented in a scalar processing device in a similar manner.

The invention will be described by example specific embodiments that comprise an example pipeline architecture having branch determination capability. However, some specific embodiments according to the present invention can also comprise branch prediction, for example. Furthermore, the specific embodiments according to the present invention described herein comprise separate instruction cache and operand cache, which are memories for storing copies of main memory. However, in alternative embodiments, the instruction cache and the operand cache can be co-located in a cache memory that contains instructions and operands.

Figure 4:
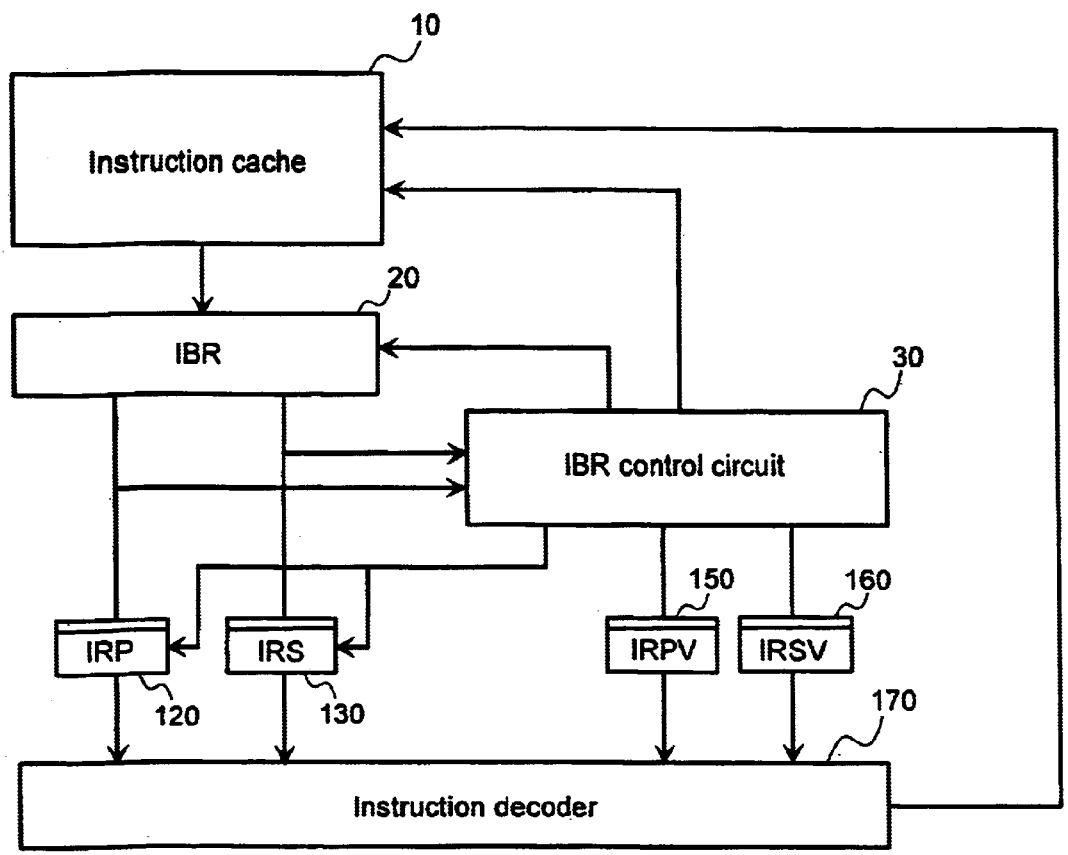
FIG. 4 illustrates a block diagram showing a sample configuration of instruction registers and an instruction decoder in a pipelining data processing device.
Figure 5:
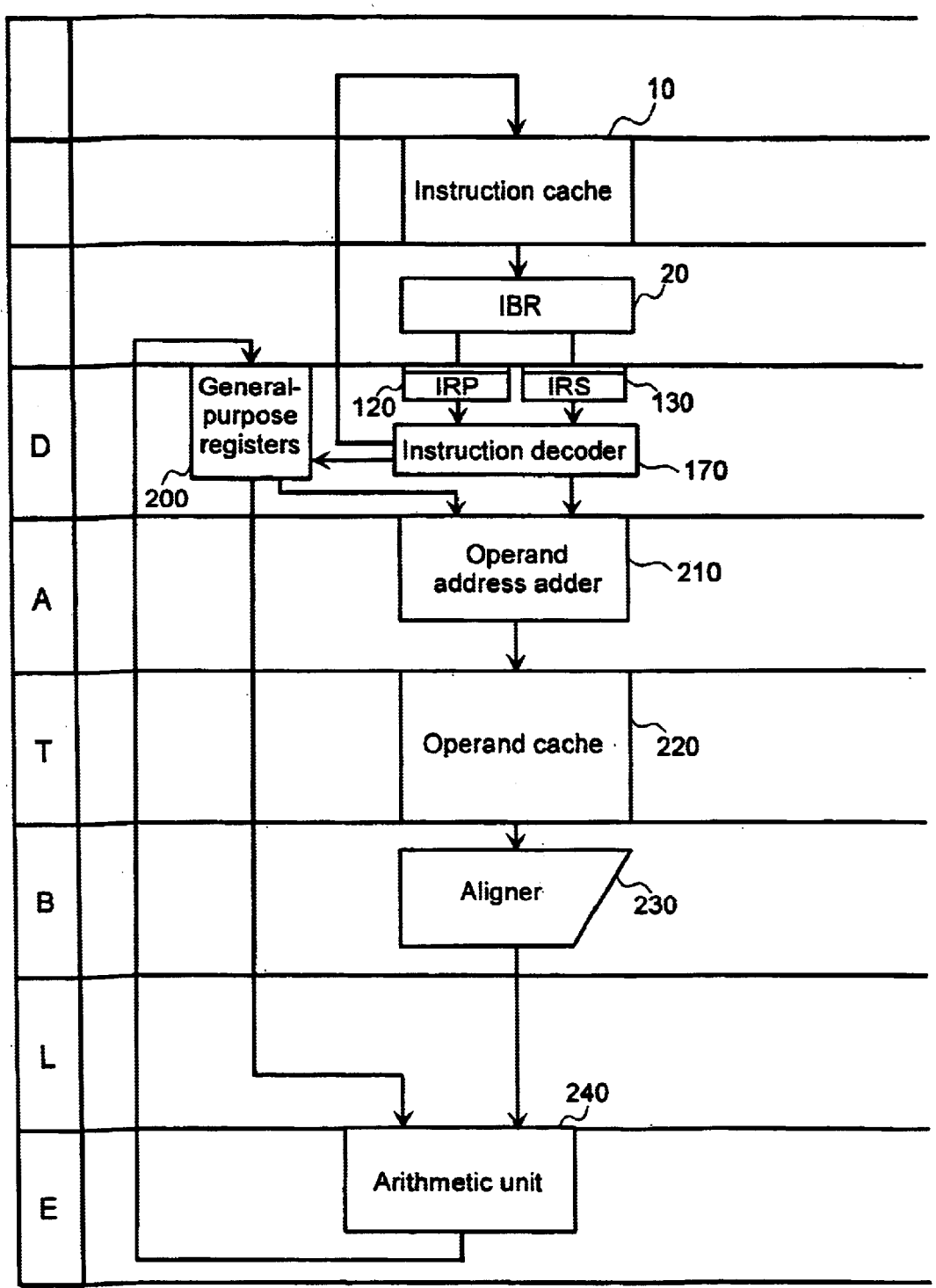
FIG. 5 illustrates a block diagram showing a sample configuration of a data processing device containing instruction registers and an instruction decoder.

FIG. 4 is a block diagram showing a sample configuration of instruction registers and an instruction decoder in a conventional pipelining data processing device. FIG. 5 is a block diagram showing a sample configuration of a data processing device containing instructions registers and an instruction decoder. FIG. 6 shows a sample flow of operations for a series of instructions including a branch instruction. FIG. 7 is a timing chart for the purpose of describing the operations performed for the series of instructions shown in FIG. 6. The following is a description of a data processing device based on the conventional technology, with references to FIG. 4 through FIG. 7.

In FIG. 4, there is shown: an instruction cache 10 holding a copy of memory; an instruction buffer (IBR) holding multiple instructions read from the instruction cache; a first instruction register (IRP) 120 holding the instruction to be executed next; a second instruction register (IRS) 130 holding the instruction following the IRP 120; an identifier (IRPV) 150 indicating whether the instruction stored in the IRP 120 is valid; an identifier (IRSV) 160 indicating whether the instruction stored in the IRS 130 is valid; an IBR control circuit 30 controlling the IBR 20, the IRP 120; the IRS 130, the IRPV 150, and the IRSV 160; and an instruction decoder 170 decoding the instructions stored in the IRP 120 and the IRS 130.

The multiple instructions read from the instruction cache 10 are stored in the IBR 20. The instruction to be executed next is taken from the IBR 20 and set up in the IRP 120. At the same time, the instruction following the instruction set up in the IRP 120 is taken from the IBR 20 and set up in the IRS 130.

High-performance data processing devices use a superscalar system in which multiple instructions are processed simultaneously. The IBR control circuit 30 determines whether the combination of instructions set up in the IRP 120 and the IRS 130 is a combination for which superscalar processing can be applied. If the instruction combination set up in the IRP 120 and the IRS 130 is a superscalable instruction combination, the IBR control circuit 30 set the IRPV 150 and the IRSV 160 to '1' to indicate that both instructions valid. If the instruction combination set up in the IRP 120 and the IRS 130 is not a superscalable combination, or if the instruction following the instruction set up in the IRP 120 has not been stored in the IBR 20, then the IBR control circuit 30 sets only the IRPV 150 to '1'.

If the instruction set up in the IRP 120 has not yet been stored in the IBR 20, the IBR control circuit 30 sets the IRPV 150 and the IRSV 160 to '0'. The IBR control circuit 30 also requests the IBR 20 to transfer the instruction to be executed next. If, at this point, the IRPV 150 and the IRSV 160 are both set to '1', the IBR 20 is requested to transfer the instruction following the instruction set up in the IRS 130. If only the IRPV 150 is set to '1', a request is made to transfer the instruction following the instruction set up in the IRP 120. If the IBR 20 is empty, the IBR control circuit 30 issues a read instruction request to the instruction cache 10.

The instruction decoder 170 decodes the instructions stored in the IRP 120 and the IRS 130.

If a branch instruction is decoded from the IRP 120 or the IRS 130, the instruction decoder 170 sends a read instruction request to the instruction cache 10 for the instruction at the branch destination.

The following is a description of the operations performed at each pipeline stage in the data processing device based on the conventional technology, with references to FIG. 5.

In FIG. 5, there is shown: the instruction cache 10; the IBR 20; the IRP 120; the IRS 130; the instruction decoder 170; a general-purpose register set 200 formed from, e.g., sixteen registers; an operand address adder 210 calculating a memory operand address needed for instruction execution using the contents of a general-purpose register 200 specified for operand address calculations by decoding results from the instruction decoder 170, as well as an offset value specified by the instruction; an operand cache 220 holding a copy of memory; an aligner 230 aligning data read from the operand cache so that the section used for the calculation is at the beginning; and an arithmetic unit 240 performing calculations using the memory operand aligned by the aligner 230 and the contents of the general-purpose register 200 specified for arithmetic by the decoding results from the instruction decoder 170.

In the D stage, the instructions set in the IRP 120 and the IRS 130 are decoded within the same stage by the instruction decoder 170. The register of the number specified by the instruction decoding results is read from the general-purpose registers 200 and transferred to the operand address adder 210. The offset value, which is also part of the decoding results, is transferred to the operand address adder 210.

In the A stage, the operand address adder 210 performs calculations based on the contents of the specified general-purpose register and the offset value. This calculation provides an operand address for the memory operand storage destination, which is necessary for executing the instruction. The operand address determined by the operand address adder 210 is transferred to the operand cache 220.

In the T stage, the operand cache is referenced, and the data read from the operand cache is transferred to the aligner 230.

In the B stage, the data read from the operand cache 220 is rearranged so that the operand data is arranged sequentially.

In the L stage, this is transferred to the arithmetic unit.

In the E stage, calculations are performed using the memory operand from the aligner 220 and the register operand from the general-purpose registers 200. The result is written to the general-purpose register 200.

In this manner, instructions are executed in six separate pipeline stages: D, A, T, B, L, E.

The following is a description of the operations performed for a series of instructions that includes a branch instruction.

In the instruction series shown in FIG. 6, L is a load instruction, A is an add instruction, ST is a store instruction, C is a compare instruction, and BC is a conditional ranch instruction. GR1 through GR4 are general-purpose registers used for instruction execution, and test 1 through test 6 and pr1 are labels indicating memory areas.

FIG. 7 is a timing chart showing how the series of instructions in FIG. 6 is executed.

In FIG. 7, the horizontal axis represents time, with each unit indicating one machine cycle. The numbers 1 through 21 on the horizontal axis are arbitrary cycle numbers provided to facilitate the discussion. The following is a description of the operations performed for the instruction series shown in FIG. 6, with references to FIG. 5 and FIG. 7.

At cycle 2, the L instruction is set up in the IRP 120. At this time, the A instruction following the L instruction is set up in the IRS 130. However, both the L instruction and the A instruction requires references to memory operands, resulting in conflicts for the operand address adder 210 and the operand cache 220. This prevents superscalar operations. Thus, at cycle 2, only the L instruction is decoded. The address is calculated at cycle 3, the operand cache is referenced at cycle 4, the data that was read is aligned at cycle 5, the results are transferred to the arithmetic unit 240 at cycle 6, and calculations are performed at cycle 7. The subsequent A instruction, ST instruction, L instruction, A instruction, and ST instruction are performed in the same manner as this L instruction.

Then, at cycle 9, a C instruction is set up in the IRP 120. At the same time, a BC instruction is set up in the IRS 130. The BC instruction does not use the operand address adder 210 or the operand cache 220, so superscalar processing can be performed with the C instruction. As a result, the BC instruction is decoded at cycle 9, and a request to read the branch destination instruction is issued to the instruction cache 10. From cycle 10 through cycle 12, the instruction is read from the instruction cache and stored in the IBR 20. At cycle 13, the branch destination instruction, an L instruction, is set up in the IRP 120. Then, the A instruction and the ST instruction are processed in sequence, and the execution of the ST instruction is completed at cycle 20.

In the data processing device based on the conventional technology described above, the reading of the branch destination instruction takes place only after the branch instruction is decoded. Thus, there is a three-cycle delay before the decoding of the branch destination instruction is begun. In other words, when a branch instruction is encountered, decoding of the branch destination instruction generally cannot begin until reading of the branch destination instruction is completed. As a result, the execution of the instructions following the branch instruction are delayed.

Various improvements have been proposed in response to this type of pipeline break (delay) resulting from branch instructions. Notable examples are presented in Japanese laid-open patent publication numbers Hei 7-239781 and Hei 2-28724.

This embodiment covers a superscalar processing device that is essentially equipped with two pipelines. However, as described with reference to the conventional technology, the operand cache cannot be accessed for two instructions simultaneously, so two instructions are executed in parallel only when this is not the case. The embodiment described below is a superscalar processing device, but the present invention can also be implemented in a scalar processing device in a similar manner.

This embodiment takes as an example a pipeline system that assumes branch determination, but it would also be possible to combine this with technologies such as branch prediction. Furthermore, in this embodiment the instruction cache and the operand cache, which are memories for storing copies of main memory, are formed separately. It would also be possible to have the instruction cache and the operand cache placed in a cache memory that contains instructions and operands.

The following is a detailed description of an embodiment of a data processing device according to the present invention, with references to the drawings.

Figure 1:
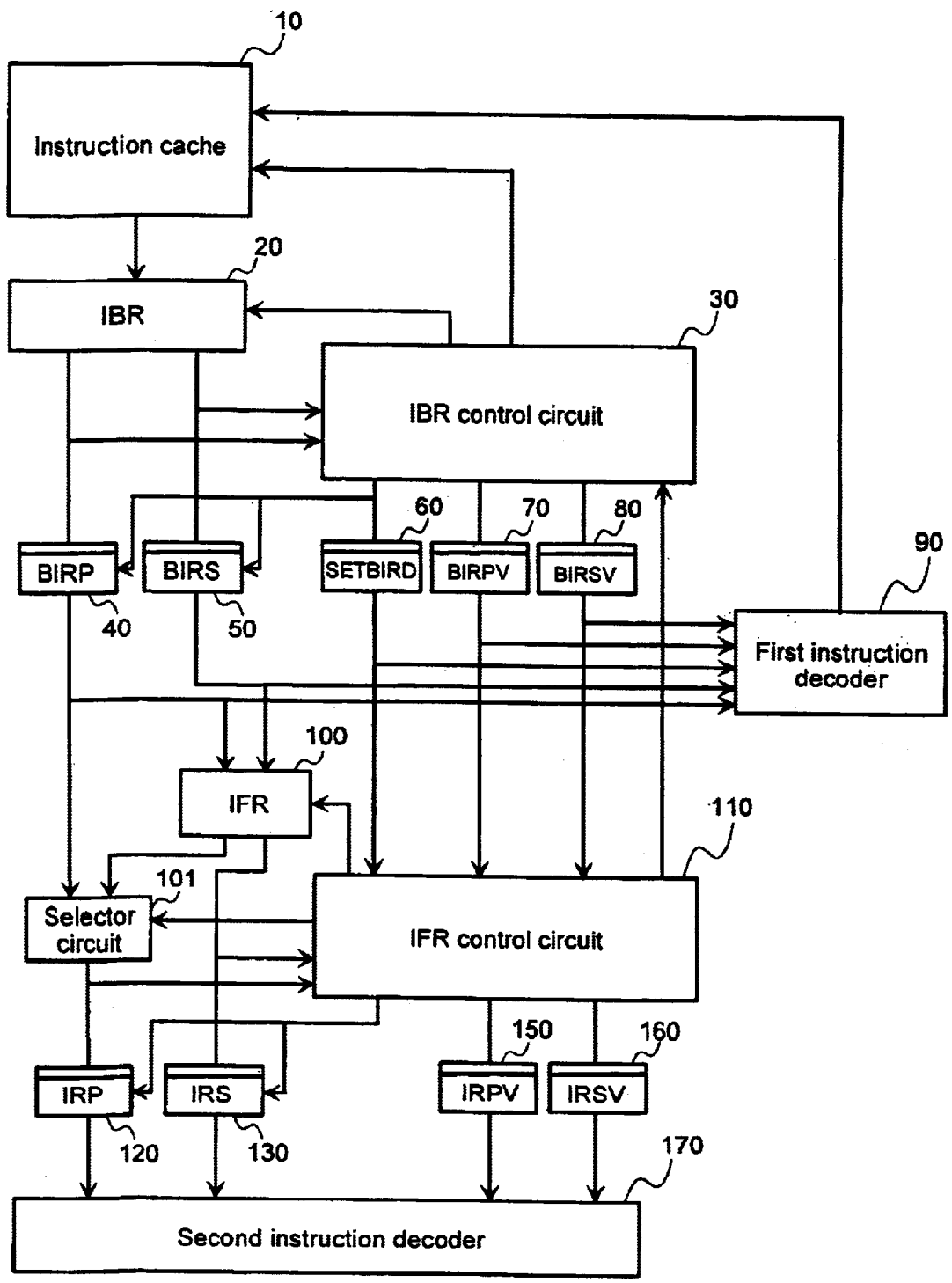
FIG. 1 illustrates a block diagram showing a sample configuration of instruction registers and an instruction decoder in a pipelining data processing device according to an embodiment of the present invention.
Figure 2:
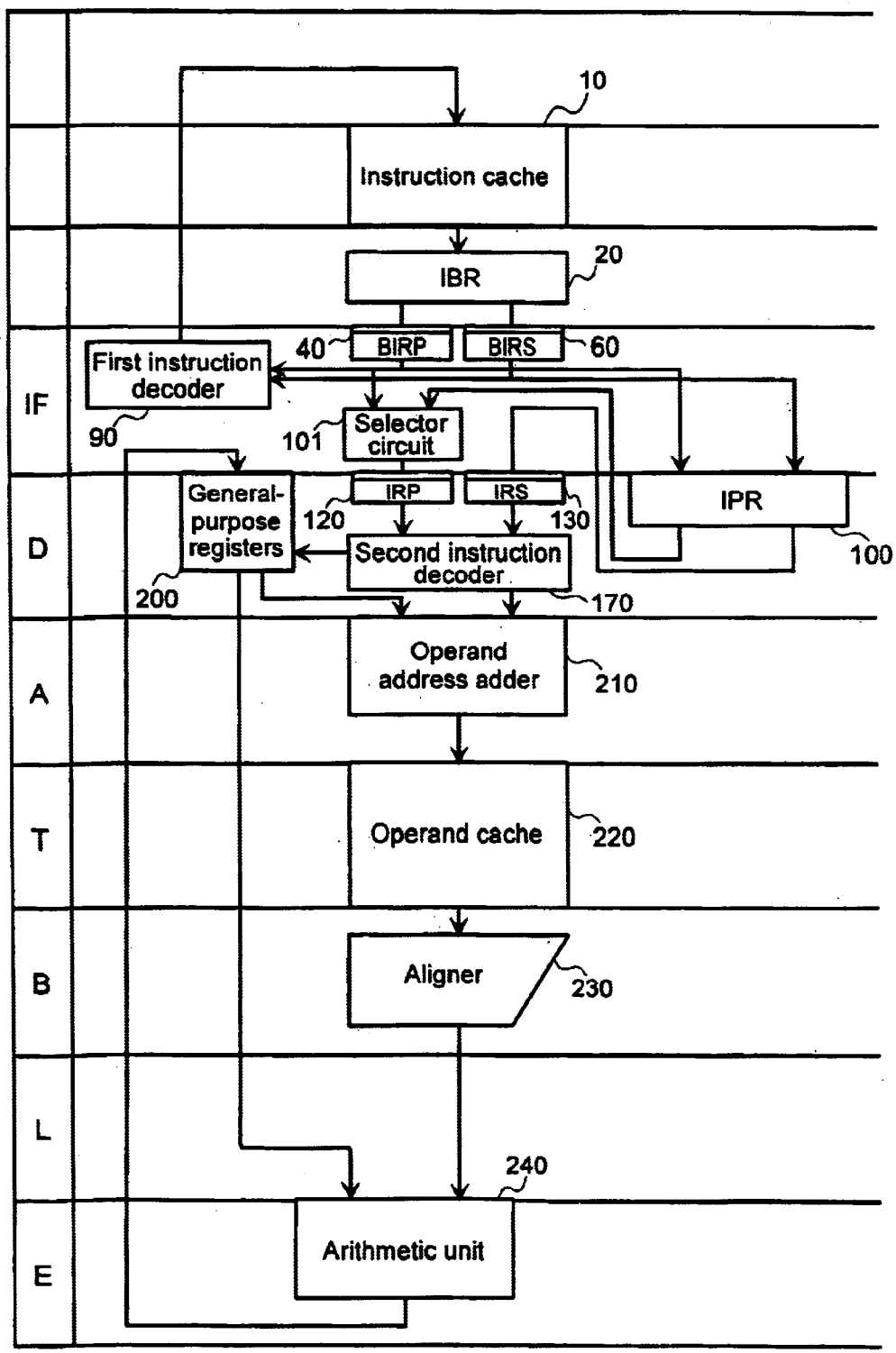
FIG. 2 illustrates a block diagram showing a sample configuration of a data processing device containing instruction registers and an instruction decoder according to an embodiment of the present invention.
Figure 3:
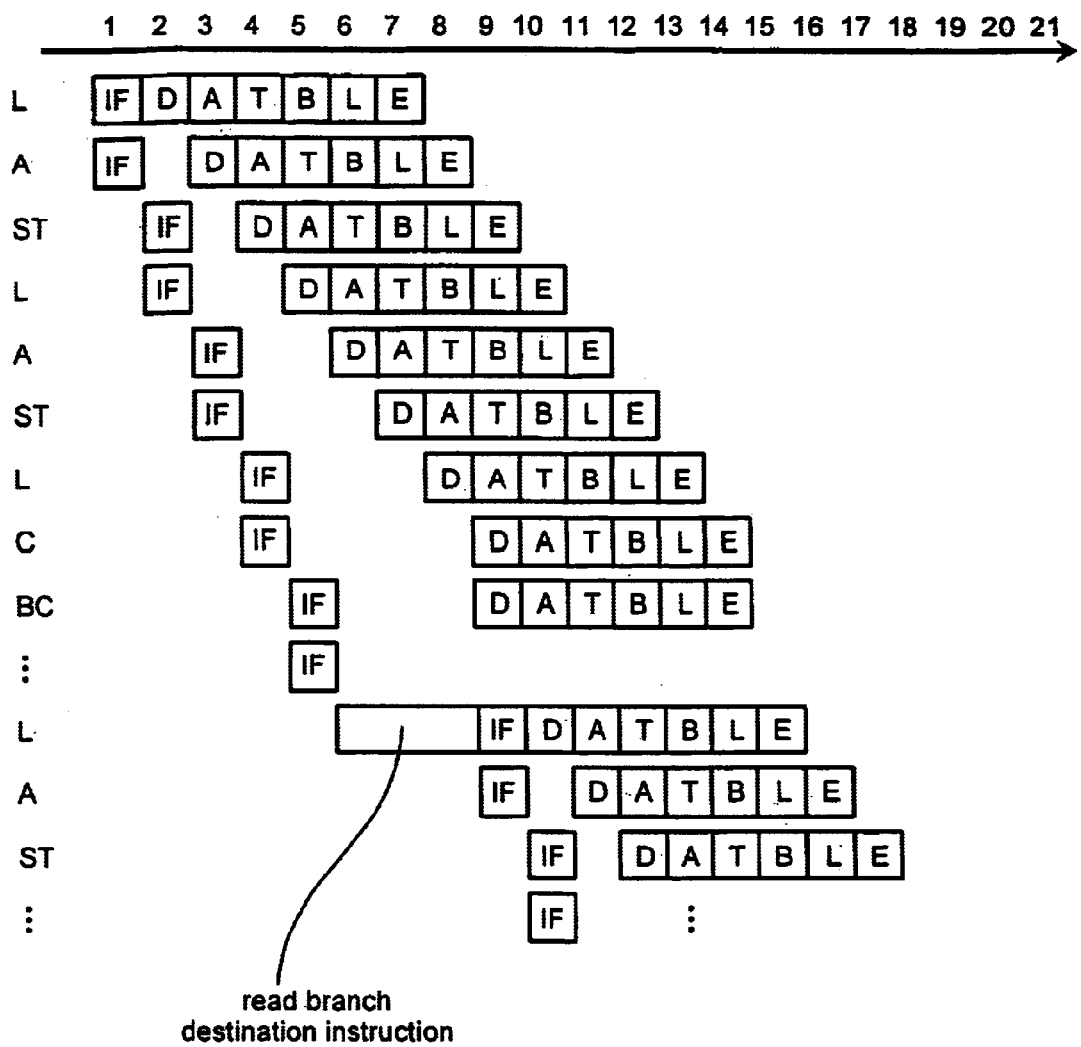
FIG. 3 illustrates a timing chart for the purpose of describing the operations of an embodiment of the present invention for the instruction series shown in FIG. 6.

FIG. 1 is a block diagram showing a sample architecture of instruction registers and an instruction decoder section of a pipelining data processing device according to an embodiment of the present invention. FIG. 2 is a block diagram showing a sample architecture of a data processing device containing instruction registers and an instruction decoder. FIG. 3 is a timing chart for the purpose of describing operations performed for the instruction series shown in FIG. 6. The following is a description of a data processing device according to the present invention, with references to FIG. 1 through FIG. 3.

In FIG. 1, there is shown an instruction cache 10 holding a copy of memory; an instruction buffer (IBR) 20 holding multiple instructions read from the instruction cache; a first branch instruction register (BIRP) 40 holding the next instruction to be decoded in a first instruction decoding stage; a second branch instruction register (BIRS) 50 holding the instruction following the BIRP 40; a set signal latch (SETBIRD) 60 setting up instructions in the BIRP 40 and the BIRS 50; an identifier (BIRPV) 70 indicating the validity of the instruction stored in the BIRP 40; an identifier (BIRSV) 80 indicating the validity of the instruction stored in the BIRS 50; an IBR control circuit 30 controlling the IBR 20, the BIRP 40, the BIRS 50, the SETBIRD 60, the BIRPV 70, and the BIRSV 80; a first instruction decoder 90 decoding the instructions stored in the BIRP 40 and the BIRS 50; and an instruction flow registers (IFR) 100 sequentially storing the instructions set up in the BIRP 40 and the BIRS 50 and comprising of a set of registers that can, for example, store eight instructions.

A selector circuit 101 selects between the output from the BIRP 40 and the output from the IFR 100. A first instruction register (IRP) 120 holds the next instruction to be decoded in a second instruction decoding stage. A second instruction register (IRS) 130 holds the instruction following the IRP 120. An identifier (IRPV) 150 indicates whether the instruction stored in the IRP 120 is valid. An identifier (IRSV) 160 indicates whether the instruction stored in the IRS 130 is valid. An IFR control circuit 110 controls the IFR 100, the selector circuit 101, the IRP 120, the IRS 130, the IRPV 150, and the IRSV 160. A second instruction decoder 170 decodes the instructions stored in the IRP 120 and the IRS 130.

If there is no instruction in the IFR 100, the selector circuit 101 bypasses the IFR 100 and stores the instruction in the BIRP 40 in the IRP 120. However, this can be eliminated if instructions always go through the IFR 100 and the design philosophy permits idle cycles in certain cases. Also, this embodiment does not provide a selector circuit in path from the BIRS 50 to the IRS 130 due to stage time restrictions. However, it would be possible to provide a selector circuit here depending on the design. Also, in this example, the first branch instruction register (BIRP) 40 and the second branch instruction register (BIRS) 50 are formed as two physically separate registers. However, the important thing is that multiple instructions can be read and decoded during one cycle, so a single register can be used as long as the necessary write and read operations can be performed, and these can be referred to functionally as first and second branch instruction registers.

The multiple instructions read from the instruction cache 10 are stored in the IBR 20. The instruction to be decoded next is taken from the IBR 20 and set up in the BIRP 40. At the same time, the instruction following the instruction set up in the BIRP 40 is taken from the IBR 20 and set up in the BIRS 50. The IBR control circuit 30 determines if the instructions set up in the BIRP 40 and the BIRS 50 are valid or not. Validity indicates that the entire instruction is stored in the register. If the instructions set up in the BIRP 40 and the BIRS 50 are both valid instructions, the IBR control circuit 30 indicates that both instructions are valid by setting the BIRPV 70 and the BIRSV 80 to '1'.

If the instruction following the instruction set up in the BIRP 40 has not been stored in the IBR 20 yet, the IBR control circuit 30 sets only the BIRPV 70 to '1'. If the instruction set up in the BIRP 40 has not been stored in the IBR 20 yet, the IBR control circuit 30 sets the BIRPV 70 and the BIRSV 80 to '0'. The IBR control circuit 30 also requests the IBR 20 to take the next instruction to be executed. At this point, if both the BIRPV 70 and the BIRSV 80 are set to '1', a request is made to take the instruction following the instruction set up in the BIRS 50. If only the BIRPV 70 is set to '1', a request is made to take the instruction following the instruction set up in the BIRP 40. If the IBR 20 is empty, the IBR control circuit 30 requests an instruction read from the instruction cache 10.

The first instruction decoder 90 decodes the instructions determined to be valid out of the BIRPV 70 and the BIRSV 80, which are stored in the BIRP 40 and the BIRS 50. If a branch instruction is decoded from the BIRP 40 or the BIRS 50, the first instruction decoder 90 requests the instruction cache 10 to read a branch destination instruction. The instructions set up in the BIRP 40 and the BIRS 50 are sequentially stored in the IFR 100. In this operation of storing instructions in the IFR 100, the IFR control circuit 110 stores both the instruction set up in the BIRP 40 and the instruction set up in the BIRS 50 in the IFR 100 if SETBIRD 60 is set to '1' (i.e., there is open space in IFR 100) and the BIRPV 70 is set to '1' and the BIRSV 80 is set to '1' (i.e., all the instructions are valid). If SETBIRD 60 is set to '1' and the BIRPV 70 is set to '1' and the BIRSV 80 is set to '0', then only the instruction set up in the BIRP 40 is stored in the IFR 100. If the SETBIRD 60 is set to '1' and the BIRPV 70 is set to '0' and the BIRSV 80 is set to '0' (i.e., there is no open space in the IFR 100), then no instructions are stored in the IFR 100.

Following instructions from the IFR control circuit 110, the selector circuit 101 selects the output from the BIRP 40 if there are no instructions in the IFR 100 and selects the first output from the IFR 100 if an instruction is present in the IFR 100 (the issues regarding the selector circuit are as described above). Of the instructions stored in the IFR 100, the earliest instruction stored, i.e., the instruction to be decoded next, is output as the first output of the IFR 100. The second output of the IFR 100 is the instruction following the instruction output as the first output. The output from the selector circuit 101, i.e., the instruction to be decoded next, is set up in the IRP 120. At the same time, the instruction following the instruction set up in the IRP 120 is taken from the IFR 100 and is set up in the IRS 130 via the second output of the IFR 100.

The IFR control circuit 110 determines if the combination of instructions set up in the IRP 120 and the IRS 130 is an instruction combination that allows for superscalar processing.

This determination is made based on whether there will be a conflict in read operations from memory known as an operand cache. If the combination of instructions set up in the IRP 120 and the IRS 130 is an instruction combination that allows for superscalar processing, the IFR control circuit 110 sets the IRPV 150 and the IRSV 160 to '1'.

If the combination of instructions set up in the IRP 120 and the IRS 130 is an instruction combination that does not allow for superscalar processing, or if the instruction following the instruction set up in the IRP 120 has not been stored in the IFR 100 yet, then the IFR control circuit 110 sets only the IRPV 150 to '1'. If the instruction set up in the IRP 120 has not yet been stored in the IBR 20, then the IFR control circuit 110 sets the IRPV 150 and the IRSV 160 to '0'. Also, the IFR control circuit 110 requests the IFR 100 to take the instruction to be executed next. At this point, if both the IRPV 150 and the IRSV 160 are set to '1', a request is made to take out the instruction following the instruction set up in the IRS 130. If only the IRPV 150 is set to '1', then a request is made to take out the instruction following the instruction set up in the IRP 120.

Also, if it is determined that all eight instructions' worth of registers in the IFR 100 are in use, the IFR control circuit 110 issues a request to the IBR control circuit 30 to halt setting up instructions to the BIRP 40 and the BIRS 50. When the setting up of instructions to the BIRP 40 and the BIRS 50 is halted, the SETBIRD 60 is set to '0' and instructions are not stored to the IFR 100. Thus, there will be no overwriting of information with undecoded instructions remaining in the IFR 100. The second instruction decoder 170 decodes the instructions stored in the IRP 120 and the IRS 130.

The following is a description of the operations performed in each of the pipeline stages in the data processing device according to the present invention, with references to FIG. 2.

In FIG. 2, there is shown: the instruction cache 10; the IBR 20; the BIRP 40; the BIRS 50; the first instruction decoder 90; the IFR 100; the selector circuit 101; the IRP 120; the IRS 130; the second instruction decoder 170; the general-purpose registers 200; the operand address adder 210 calculating a memory operand address needed for instruction execution using the contents of a general-purpose register 200 specified for operand address calculations by the decoding results from the instruction decoder 170 as well as an offset value specified by the instruction; an operand cache 220 holding a copy of memory; an aligner 230 aligning data read from the operand cache so that the section used for the calculation is at the beginning; and an arithmetic unit 240 performing calculations using the memory operand aligned by the aligner 230 and the contents of the general-purpose register 200 specified for arithmetic by the decoding results from the instruction decoder 170.

In the IF stage, the instructions set up in the BIRP 40 and the BIRS 50 are decoded by the first instruction decoder 90. If the first instruction decoder 90 decodes a branch instruction, a branch destination instruction read request is issued to the instruction cache 10. The instructions set up in the BIRP 40 and the BIRS 50 are stored in the IFR 100. The instruction set up in the BIRP 40 is also transferred to the selector circuit 101. In this manner, decoding is performed on two instructions at a time during one machine cycle in the IF stage, which is the first instruction decoding stage. In the D stage, which is the second instruction decoding stage, the instructions are transferred. The circuit implementing this IF stage will be referred to as an instruction fetching circuit.

In the D stage, which is the second instruction decoding stage, the instructions set up in the IRP 120 and the IRS 130 are decoded by the second instruction decoder 170. Instruction combinations that allow two instructions to be decoded at the same time by the second instruction decoder are combinations which do not involve both instructions requiring memory operand referencing. In other words, two instructions can be decoded at the same time if at least one of the two instructions is a register-register operation instruction or is a branch instruction that does not require memory operand referencing. On average, two instructions cannot be decoded in one machine cycle during the D stage, which is the second instruction decoding stage, since instructions that require memory operand referencing generally occur frequently. Also, in the D stage, the general-purpose register in the general-purpose registers 200 that is specified by the decoding results of the instruction is read and is transferred to the operand address adder 210. An offset value, which is a separate decoding result, is also transferred to the operand address adder 210. The circuit implementing the D stage will be referred to as the decoder circuit.

In the A stage, an operand address to which the memory operand required for executing the instruction is stored is calculated by the operand address adder 210 using the contents of the specified general-purpose register and the offset value. The operand address determined by the operand address adder 210 is transferred to the operand cache 220.

In the T stage, the operand cache is accessed. The data read from the operand cache is transferred to the aligner 230.

In the B stage, the data read from the operand cache 220 is rearranged and is transferred to the arithmetic unit in the L stage.

In the E stage, the memory operand from the aligner 220 and the register operand from the general-purpose registers 200 are used to perform calculations. The result is written to the general-purpose registers 200.

In this manner, instructions are executed in seven separate pipeline stages: IF, D, A, T, B, L, and E.

The following is a description of the operations performed for a series of instructions containing a branch instruction.

FIG. 3 shows a timing chart for the execution of the series of instructions shown in FIG. 6. In FIG. 3, the horizontal axis represents time, with each unit indicating one machine cycle. The numbers 1 through 21 on the horizontal axis are arbitrary cycle numbers provided to facilitate the discussion.

The following is a description of the operations performed for the instruction series shown in FIG. 6, with references to FIG. 2 and FIG. 3.

At cycle 1, the L instruction is set up in the BIRP 40 and the A instruction is set up in the BIRS 50. The instructions set up in the BIRP 40 and the BIRS 50 at cycle 1 are decoded by the first instruction decoder 90 and transferred to the IFR 100. Also, since there are no instructions stored in the IFR 100 at cycle 1, the selector circuit 101 is selected to the output from the BIRP 40.

At cycle 2, the ST instruction and the L instruction are set up in the BIRP 40 and the BIRS 50 respectively. These instructions are decoded by the first instruction decoder 90 and transferred to the IFR 100.

At cycle 3, the A instruction and the ST instruction are set up in the BIRP 40 and the BIRS 50, the instructions are decoded by the first instruction decoder 90 and then transferred to the IFR 100. At cycle 4, the same operations are performed for the L instruction and the C instruction.

Next, at cycle 5, the BC instruction is set up in the BIRP 40 and is transferred to the IFR 100. The first instruction decoder 90 decodes the BC instruction set up in the BIRP 40 as a branch instruction and requests the instruction cache 10 for a branch destination instruction read. From cycle 6 through cycle 8, instructions are read from the instruction cache 10 and stored in the IBR 20. (In other words, the storing of instructions from the instruction cache 10 to the IBR 20 takes three machine cycles in this case.) Thus, the L instruction and the A instruction, which are the branch destination instructions for the BC instruction, are set up in the BIRP 40 and the BIRS 50 at cycle 9. These are decoded by the first instruction decoder 90 and transferred to the IFR 100 as well as the selector circuit 101. Then, at cycle 10, the ST instruction is set up in the BIRP 40, decoded by the first instruction decoder 90, and transferred to the IFR 100.

In this manner, two instructions are decoded at each cycle in the IF stage, and instructions are transferred sequentially to the IFR 100. At cycle 2, the L instruction is selected by the selector circuit 101 and set up in the IRP 120. At this point, the IRS 130 is not set up since the A instruction following the L instruction is still being transferred to the IFR. Thus, at cycle 2, only the L instruction is decoded. Then, address calculations are performed at cycle 3, the operand cache is accessed at cycle 4, the read data is aligned at cycle 5, the data is transferred to the arithmetic unit 240 at cycle 6, and calculations are performed at cycle 7. The same operations are subsequently performed for the A instruction, the ST instruction, the L instruction, the A instruction, the ST instruction, and the L instruction.

Next, at cycle 9, the C instruction is set up in the IRP 120. At the same time, the BC instruction is set up in the IRS 130. Since the BC instruction does not use the operand address adder 210 or the operand cache 220, it is superscalable with the C instruction. Thus, the BC instruction is decoded by the second instruction decoder 170 at cycle 9. At cycle 10, the L instruction, which is the branch destination instruction for the BC instruction is set up in the IRP 120. Since setting up the IRP 120 from the IFR 100 would take up one extra machine cycle, the IRP 120 is set through the selector circuit 101. In other words, the branch destination instruction decoding stage can be started without any idle cycles.

If there is another machine cycle difference between the IF and the decode stage D for the BIRP 40 and the BIRS 50, an instruction from the IFR 100 can be set up in the IRP 120. There will generally be many instructions set up from the IFR 120. This depends on the type of instruction series. The sample instruction series shown in FIG. 6 is as described above.

Subsequently, the A instruction and the ST instruction are processed sequentially and execution of the ST instruction is completed at cycle 17.

In this manner, this embodiment allows easy look-ahead of branch destination instructions and allows decoding of branch destination instructions with no idle cycles.

In the embodiment described above, the first instruction decoder decodes two instructions at a time while, as described above, the second instruction decoder does not necessary execute two instructions at a time even with superscalar processing. Thus, on average, the second instruction decoder will decode a smaller number of instructions for execution. For scalar computers, the average will not exceed one instruction decode/cycle. Due to the look-ahead for the branch destination instruction, the number of look-ahead instructions decoded in one cycle by the first decoder will stay higher than the instruction execution decode count for one cycle. This makes look-ahead of branch destination instructions possible.

The preceding has been a description of the preferred embodiment of the invention. It will be appreciated that deviations and modifications can be made without departing from the scope of the invention, which is defined by the appended claims.

What is claimed is:

1. A data processing device comprising:
    an instruction buffer that holds pre-fetched instructions;
    a first instruction register that stores a plurality of instructions read from said instruction buffer;
    a first instruction decoder that decodes said plurality of instructions in said first instruction register;
    an instruction flow register that sequentially stores instructions stored in said first instruction register;
    a second instruction register that stores an instruction output from said first instruction register or from said instruction flow register;
    a second instruction decoder that decodes instructions stored in said second instruction register; and wherein an instruction read request is issued based on an analysis result from said first instruction decoder; and
    a selector circuit that allows selective storage to said second instruction register of output from either said first instruction register or said instruction flow register.

2. The data processing device of claim 1, wherein, when said first instruction decoder decodes a branch instruction, said instruction read request comprises a request to read a branch destination instruction for said branch instruction.

3. The data processing device of claim 1, wherein said first instruction register is formed from a plurality of instruction registers.

4. The data processing device of claim 1, further comprising:
    a first instruction register validity identifier that takes on a first value if an instruction in said first instruction register is valid;
    a set signal latch that takes on said first value if space is available in said instruction flow register; and
    a control circuit that stores an instruction stored in said first instruction register in said instruction flow register if said first register validity identifier is said first value and said set signal latch is said first value.

5. The data processing device of claim 4, wherein if said control circuit detects that all of said instruction flow registers are in use, said control circuit prevents said set signal latch from taking on said first value.

6. A data processing device comprising:
    an instruction buffer holding instructions pre-fetched from a memory;
    a first instruction register holding a plurality of instructions read from said instruction buffer;
    a first instruction decoder decoding a plurality of instructions from said first instruction register;
    an instruction flow register sequentially storing instructions stored in said first instruction register;
    a second instruction register storing instructions output from said instruction flow register; and
    a second instruction decoder decoding instructions stored in said second instruction register; wherein an instruction read request is issued to said memory based on an analysis result from said first instruction decoder; and
    a selector circuit that allows selective storage to said second instruction register of output from either said first instruction register or said instruction flow register.

7. A data processing device operable to perform pipeline processing of instructions, said data processing device comprising:
    an instruction cache;
    an instruction buffer that stores instructions pre-fetched from said cache;
    a register that reads a plurality of instructions from said instruction buffer in one machine cycle of said data processing device;
    a first instruction decoder that decodes said read plurality of instructions and, if a branch instruction is decoded, requests said instruction cache to pre-fetch a branch destination instruction; and
    a second instruction decoder that decodes instructions read from said instruction buffer in order to perform instruction execution; wherein a number of instructions read from said instruction buffer during one machine cycle is greater than an average number of instructions decoded by said second instruction decoder during one machine cycle; and
    wherein the first instruction decoder monitors said instruction buffer for a full condition, and thereupon, pauses fetching instructions from the cache.

8. A pipeline processor comprising:
    a first instruction decoder,
    a second instruction decoder,
    an instruction buffer storing pre-fetched instructions,
    an instruction flow register storing instructions read from said instruction buffer, wherein an instruction fetching stage reads a plurality of instructions during one machine cycle of said pipeline processor, decodes said instructions read with said first instruction decoder, and, if a branch instruction results from said decoding, pre-fetches a branch destination instruction from said instruction buffer and transfers said read instruction to said instruction flow register;
    a decoding stage disposed after said instruction fetching stage and decoding instructions from said instruction flow register with said second instruction decoder; and
    the first instruction decoder monitoring said instruction buffer for an empty condition, and thereupon retrieving instructions to provide to said second instruction decoder.

9. The pipeline processor of claim 8, wherein a number of instructions read in said instruction fetching stage during one machine cycle is larger than an average number of instructions decoded in said decoding stage.

10. A pipeline processing device for pre-fetching instructions to an instruction buffer, said device comprising:
    a first instruction decoder that decodes an instruction followed by an instruction decoded by a second instruction decoder, said decoding by said first instruction decoder being faster than said decoding by said second instruction decoder; wherein, in response to said first instruction decoder detecting a branch instruction, a branch destination instruction is pre-fetched to an instruction buffer; and a monitor for monitoring the instruction buffer for a full condition, and upon detection of same pausing said pre-fetching of instructions.

11. A data processing system comprising:

a memory;

a processor, connected with said memory, wherein said processor comprises:

an instruction buffer holding instructions pre-fetched from said memory;

a first instruction register storing a plurality of instructions read from said instruction buffer;

a first instruction decoder decoding said plurality of instructions in said first instruction register;

an instruction flow register sequentially storing instructions stored in said first instruction register;

a second instruction register storing an instruction output from said first instruction register or from said instruction flow register;

a second instruction decoder decoding instructions stored in said second instruction register; and wherein an instruction read request is issued to said memory based on an analysis result from said first instruction decoder; and a selector circuit that allows selective storage to said second instruction register of Output from either said first instruction register or said instruction flow register.

12. A method for pipeline processing, comprising:

pre-fetching instructions from an instruction cache;

storing said pre-fetched instructions in an instruction buffer;

reading a plurality of instructions from said instruction buffer in one machine cycle;

decoding said plurality of instructions in a first instruction decoder;

if a branch instruction is decoded, requesting said instruction cache a pre-fetch of a branch destination instruction;

decoding instructions read from said instruction buffer in a second instruction decoder in order to perform instruction execution; and wherein a number of instructions read from said instruction buffer during one machine cycle being larger than an average number of instructions decoded by said second instruction decoder during one machine cycle; and monitoring the instruction buffer for a full condition, and upon detection of same pausing said pre-fetching of instructions.

13. A method for pipeline processing, comprising:

fetching instructions from an instruction cache;

storing said fetched instructions in an instruction buffer;

reading a plurality of instructions from said instruction buffer in one machine cycle;

decoding said plurality of instructions; and, if a branch instruction is decoded, fetching a branch destination instruction from said instruction cache;

decoding instructions read from said instruction buffer in a second instruction decoder substantially contemporaneously with said fetching a branch destination instruction; and monitoring said instruction buffer for a full condition, and thereupon, pausing said fetching and said storing of instructions.

14. The method of claim 13, further comprising:

monitoring said instruction buffer for an empty condition, and thereupon, retrieving instructions from said instruction cache and passing instructions so retrieved to said second instruction decoder.

15. The method of claim 13, further comprising:

monitoring said instruction buffer for instructions having a valid condition, and thereupon, passing said instructions to said first instruction decoder.

16. A processor, comprising:

a first decoding stage, operative to fetch instructions from an instruction cache and to store said fetched instructions into a buffer; said first decoding stage further operative to read a plurality of instructions from said buffer and decode said plurality of instructions; and, if a branch instruction is decoded, fetch a branch destination instruction from said instruction cache;

a second decoding stage, operative to decode instructions read from said buffer substantially contemporaneously with said processing in said first decoding stage; and wherein said first decoding stage monitors said buffer for a full condition, and thereupon, pauses said fetch and said store operation.

17. The processor of claim 16, wherein said first decoding stage performs said fetch of said plurality of instructions in one machine cycle.

18. The processor of claim 16, wherein said first decoding stage monitors said buffer for an empty condition, and thereupon, retrieves instructions from said instruction cache and forwards instructions so retrieved to said second decoding stage.

19. The processor of claim 16 wherein said first decoding stage monitors said buffer for instructions having a valid condition, and thereupon, decodes only those instructions which are valid.

20. A data processing device comprising:

an instruction buffer that holds pre-fetched instructions;

a first instruction register that stores a plurality of instructions read from said instruction buffer;

a first instruction decoder that decodes said plurality of instructions in said first instruction register;

an instruction flow register that sequentially stores instructions stored in said first instruction register;

a second instruction register that stores an instruction output from said first instruction register or from said instruction flow register;

a second instruction decoder that decodes instructions stored in said second instruction register; and wherein an instruction read request is issued based on an analysis result from said first instruction decoder; and a first instruction register validity identifier that takes on a first value if an instruction in said first instruction register is valid.

* * * * *